April 7, 1931.　　L. M. LAWRENCE　　1,799,827
ICE CREAM SCOOP
Filed Oct. 28, 1929　　2 Sheets-Sheet 1
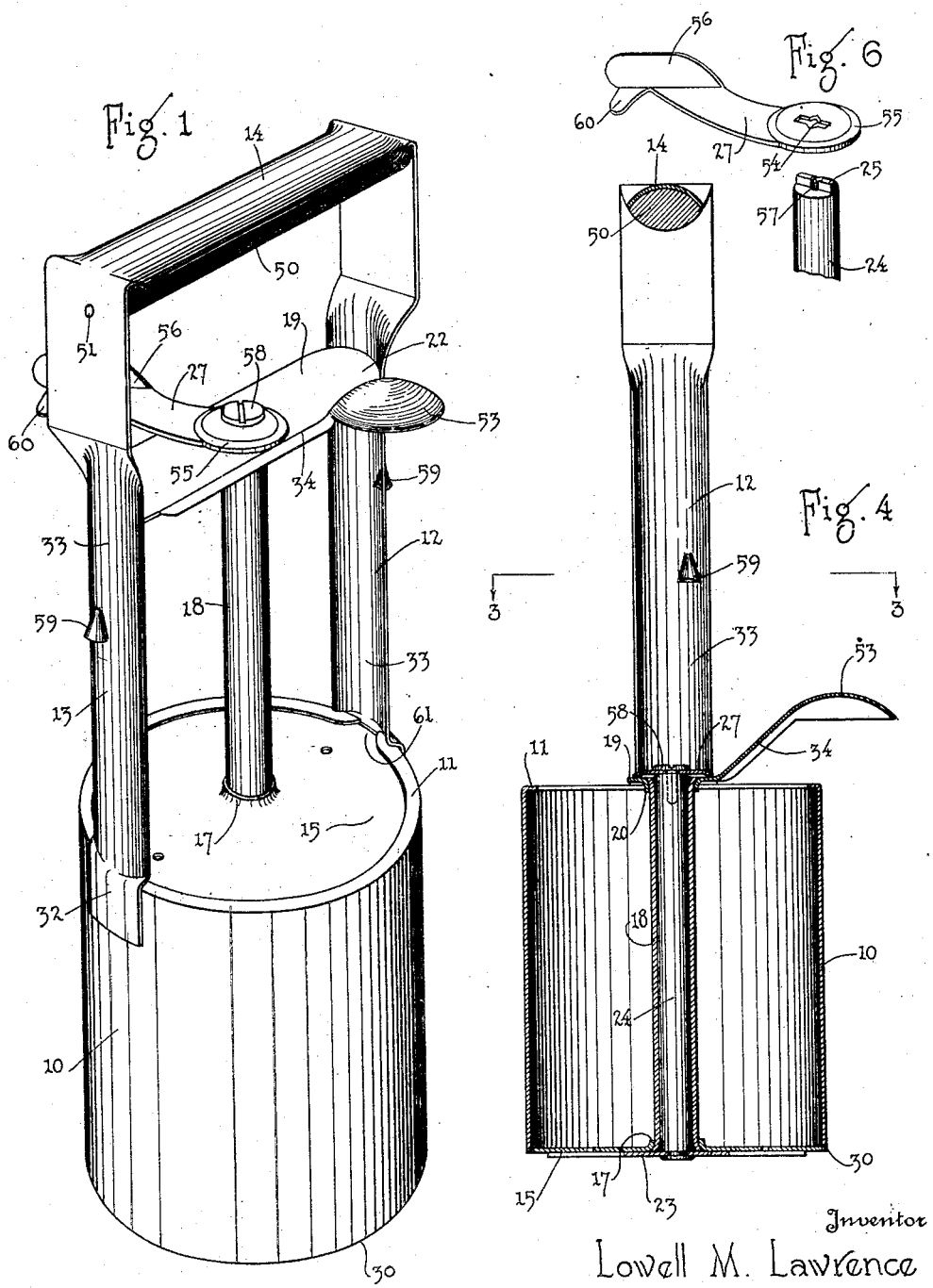
Inventor
Lowell M. Lawrence
By Caswell & Lagaard
Attorneys April 7, 1931.  L. M. LAWRENCE  1,799,827
ICE CREAM SCOOP
Filed Oct. 28, 1929   2 Sheets-Sheet 2
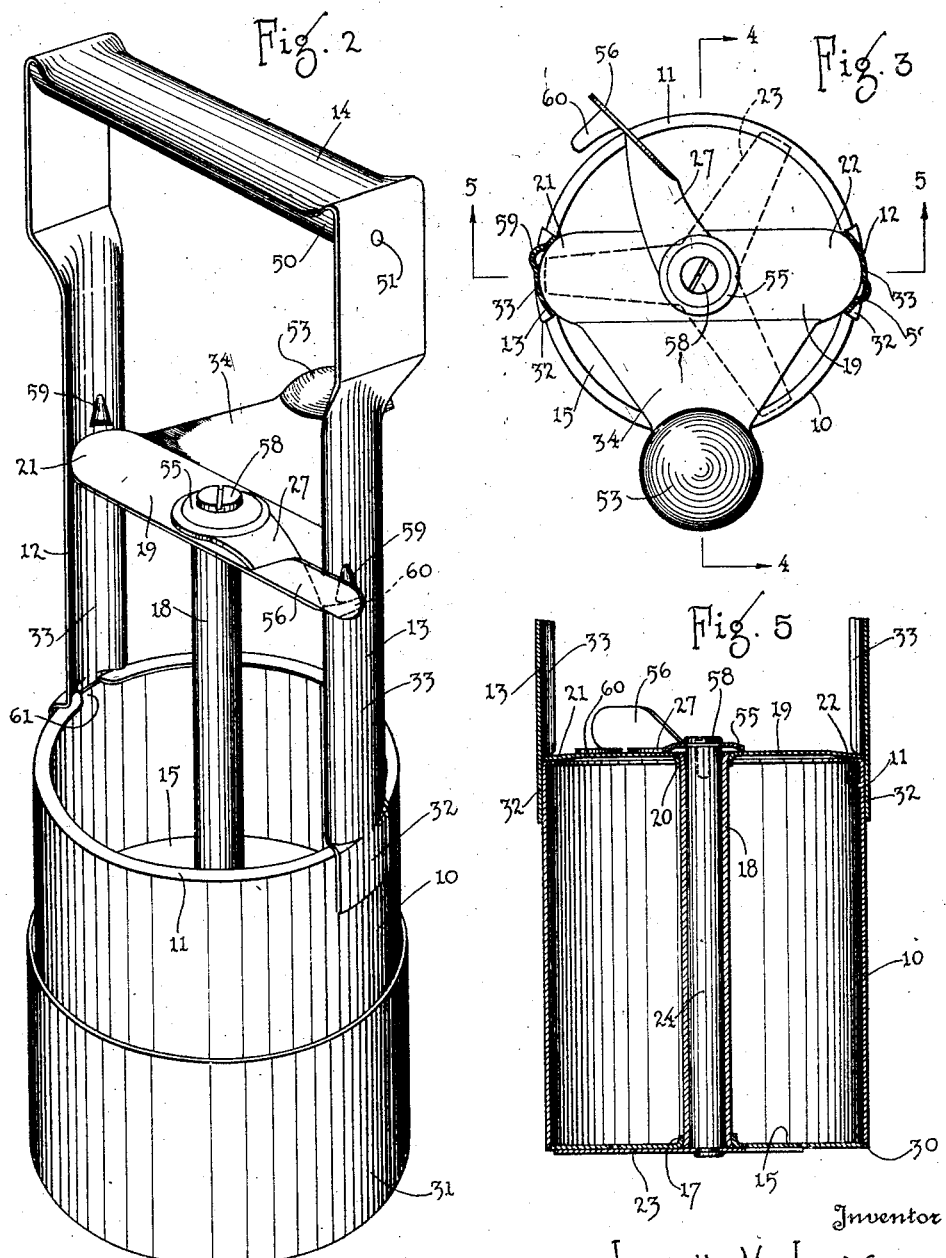
Inventor
Lowell M. Lawrence Patented Apr. 7, 1931

1,799,827

UNITED STATES PATENT OFFICE

LOWELL M. LAWRENCE, OF NEW ROCKFORD, NORTH DAKOTA

ICE-CREAM SCOOP

Application filed October 28, 1929. Serial No. 402,948.

My invention relates to ice cream packers and particularly to a device capable of use for taking measured quantities of ice cream from the bulk and depositing and packing the same in suitable containers for delivery to the trade.

This application is partly in continuation of my previous application for patent for ice cream scoops, Serial Number 239,109, filed December 10, 1927.

An object of the invention is to provide a simple, durable, inexpensive and efficient packing device of the instant character, which is relatively light in weight and readily handled and which may be readily disassembled for cleansing purposes and repair and quickly and easily reassembled for use.

Another object of the invention resides in providing a cylindrical jacket having arms attached thereto on opposite sides thereof and extending upwardly therefrom, said arms being connected at their upper ends by a handle by means of which the entire jacket may be forced bodily into bulk ice cream to cause the desired quantity of ice cream to become lodged within the jacket.

A further object of the invention resides in constructing the packer with a plunger within the jacket, the plunger having a cross-head connected therewith and slidable at its ends along said arms, said plunger serving to eject the ice cream from said jacket.

Another object of the invention resides in providing a cutter adapted to sever the ice cream from the lower surface of the plunger and in further providing a thumb piece disposed in proximity to said cross-head for operating said cutter.

A still further object of the invention resides in constructing said arms of sheet metal in curved cross sectional formation for the purpose of stiffening the arms and for providing guideways for the ends of the reciprocating cross-head.

Another object of the invention resides in constructing the jacket at its upper portion with an inwardly turned flange serving as a stop for limiting the upward movement of the plunger and the downward movement of the cross-head.

A feature of the invention resides in constructing the arms of such material that they may be forcibly sprung apart to permit of the disengagement and removal of the cross-head therefrom.

An additional object of the invention resides in forming the flange on said jacket with notches permitting of the edgewise removal of the plunger from the jacket, and in disposing said notches within the confines of the joints between the arms and jacket to prevent weakening the jacket proper.

Another object of the invention resides in providing stops on the arms for limiting the movement of the plunger, and in forming the cutter thumb piece with a member capable of coacting with said stops and adapted to be shifted into or out of cooperative relation with respect thereto upon the manipulation of said thumb piece.

A further object of the invention resides in forming the cross-head with a lateral extension, and in providing said extension with a hold-down knob readily accessible to the operator for use in holding the plunger secure as the jacket is moved relative thereto in the act of transferring ice cream from the jacket to a receptacle.

With the foregoing and other objects in view, which will appear in the following description, the invention resides in the novel combination and arrangement of parts and in the details of construction hereinafter described and claimed.

In the drawings:

Fig. 1 is a perspective view of a device embodying my invention, the plunger being shown in that relation assumed thereby when the jacket is completely filled with ice cream.

Fig. 2 is a perspective view of the device shown in Fig. 1 as viewed from a different angle, the plunger being shown as stopped in position to provide a half-measure and the jacket being inserted into an ice cream container (one-half the full size) prior to the discharge of the ice cream from the jacket.

Fig. 3 is a plan sectional view taken on line 3—3 of Fig. 4.

Fig. 4 is a vertical sectional view taken on line 4—4 of Fig. 3.

Fig. 5 is a fragmentary vertical sectional view taken on line 5—5 of Fig. 3.

Fig. 6 is a perspective view of the thumb piece and cutter shaft showing the manner of attaching the former to the latter.

In the dispensing of ice cream to the trade, considerable time and inconvenience is encountered in the present methods employed when the ice cream is removed from the bulk by spoons or scoops and filled and packed into the usual containers. These disadvantages are effectively overcome with my invention which may be readily inserted into the bulk ice cream and the desired quantity removed therefrom and quickly deposited in a container in which the same is to be sold, the entire operation consuming but a fraction of the time ordinarily used for this purpose.

My preferred form of packer is adapted for use in filling containers of circular cross-sectional formation, which, in the trade, are referred to as paper cans and which are supplied with slip covers. In Fig. 2 of the drawings, I have illustrated one of such cans or containers of one-half pint size, the same being designated by the reference numeral 31.

The illustrated embodiment of my invention includes a sleeve-like cylindrical jacket 10 formed of thin sheet material which may be sharpened at its lowermost edge 30 to enable the jacket to more readily penetrate into the bulk ice cream when pressure is applied to the packer. To the upper portion of the jacket 10 and at opposite sides thereof are secured two upwardly extending arms 12 and 13. These arms may be soldered, welded or riveted to the jacket 10 and, like the jacket 10, are formed of sheet metal. At the upper ends of the arms 12 and 13 and extending from one to the other thereof is a handle 14 which is preferably integrally constructed with said arms. Underlying the handle 14 is a filler and reinforcing strip 50 giving to the user a better and more comfortable grasp on the device, said strip being attached to the arms 12 and 13 as by nails or screws 51. The arms 12 and 13 are curved laterally at their lower portions, as indicated at 32, to conform to the curvature of the jacket 10. Beginning immediately above the upper edge of the jacket, the lateral curvature of said arms is somewhat increased, as indicated at 33, to stiffen the arms and to provide facing guideways for a purpose presently to be described. The handle 14 is also curved laterally to stiffen it and to improve the form of the grip by means of which the device is manipulated.

Within the jacket 10 is disposed a plunger 15, constructed of a disc of sheet metal having a boss 17 struck up from the center thereof. Within this boss is secured a tubular support 18 to the upper end of which is attached a cross-head 19 also constructed of sheet metal. This cross-head is formed with a boss 20, similar to the boss 17, by means of which said cross-head is secured to the tubular support 18 and is further formed with an extension 34, formed with a knob 53, by means of which the plunger 15 may be held against movement upon the withdrawal of the jacket 10 from a container. This cross-head is rounded at its ends to provide two arcuate portions 21 and 22 which conform to and ride along the curved guideways 33 of arms 12 and 13.

For the purpose of limiting the movement of the plunger 15 and reinforcing the jacket 10, said jacket is formed at its upper edge with an inwardly turned flange 11. This flange forms an abutment against which the plunger 15 marginally impinges in the fully retracted position thereof. Thus, said flange prevents the plunger from being thrust from the jacket 10 as the ice cream, in the bulk, is being packed therein. The cross-head 19 overreaches the flange 11 and the tube 18 is of such length that when the plunger 15 is in its lowermost position (Fig. 5), the said cross-head 19 engages said flange 11 and thereby limits the downward movement of said plunger. By means of this simple construction, relative movement between the plunger 15 and jacket 10 is limited, whereby the plunger is kept from being projected beyond the ends of said jacket in the normal use of the device.

For the purpose of loosening the ice cream from the plunger 15, a cutter 23 is employed. This cutter is of spider-like formation as best seen in dotted lines in Fig. 3 and is riveted to the end of a spindle 24 journaled within the tubular member 18. For rotating the cutter 23, a lever 27 is employed, the same being attached to the upper end of the spindle 24. This lever comprises a hub portion 55 and is further constructed at the end thereof with a thumb piece 56 by means of which said lever may be manipulated, said thumb piece being bent up from the material of the lever proper as best shown in Fig. 6. In order to attach the lever 27 to the spindle 24, the said spindle is caused to protrude upwardly beyond the cross head 19 where it is milled, as shown in Fig. 6, to form a key 25. This key fits into a corresponding slot 54 cut in the hub 55 of lever 27 so that when the lever 27 is applied to said spindle 24 the said parts become keyed together. The lever 27 is held in place upon the spindle 24 by means of a screw 58 which is threaded into the spindle as indicated at 57. It will be noted (Fig. 3) that the thumb piece 27 is somewhat longer than the distance between the spindle 24 and either of the arms 12 and 13. These arms, hence, serve as stops limiting the swinging of said thumb piece into the less readily accessible positions immediately between the arms 11 and 12.

In the use of the device, the packer is grasped by the handle 14 and the jacket 10 forced lower edge foremost into the bulk ice cream. The cutting edge 30 of the jacket penetrates the ice cream causing it to fill said jacket. As the ice cream enters the jacket, the plunger 15 is forced upwardly until it strikes the flange 11, which limits the upward movement thereof. By now giving the device a sharp twist, the ice cream at the bottom of the packer is severed from the bulk ice cream and the packer, with the jacket 10 filled, may be withdrawn from the bulk ice cream. In filling a container, the packer is inserted into the same in the manner shown in Fig. 2. By holding down the knob 53 and drawing the handle 14 upwardly, the jacket 10 is withdrawn from the container, leaving the ice cream deposited therein. After the jacket 10 has been sufficiently elevated to bring the flange 11 thereof against the cross-head 19, the lever 27 may be given a partial twist through thumb piece 56, which causes the cutter 23 to sever the ice cream from the plunger 15, thus entirely freeing the packer from the package.

In order partially to fill the jacket 10 with a predetermined amount of ice cream, the arms 12 and 13 are each constructed with a stop 59 struck out of the material of the arm, as best shown in Fig. 1. These stops are adapted to be engaged by a hook 60, formed on the lever 27, when said lever is swung into the position shown in Fig. 2. When it is desired completely to fill the jacket 10, the lever 27 is swung into position such as shown in Fig. 3, which permits the plunger 15 to travel to the full end of its stroke, as shown in Fig. 1. When it is desired only partially to fill said jacket, the lever 27 is swung so that one of the stops 59 is in the path of movement of the hook 60. As said hook reaches said stop (Fig. 2), the relative movement between plunger 15 and jacket 10 is arrested, thereby limiting the entry to the jacket of any more than the desired fractional measure of ice cream. If desired, various fractional measurements of ice cream may be gathered in the jacket 10 by employing several stops located at different positions along one or the other or both of the arms 12 and 13. In such case, the lever 27 would not be moved into the relation shown in Fig. 2 until the hook 60 had passed the last stop in advance of the desired stop. The two stops 59 on the arms 12 and 13 correspond, both providing for the same measured quantity of ice cream. With this correspondence between stops, the cross-head 19 may occupy reversed positions between the arms 12 and 13 and in either of the resultant positions of the lever 27, there will be a stop available for coaction with the hook 60.

Whenever it is desired to remove the plunger structure for the purpose of cleaning or repair, that end may be accomplished as follows: Both the arms 12 and 13, being constructed of suitable material, may be sprung apart without permanently losing their original form. In removing the cross-head, the plunger 15 is raised to a position such that said cross-head lies midway between the handle 14 and the flange 11, or at some position in proximity thereto. Pressure may then be applied to the two arms 12 and 13 so as to spring them apart sufficiently to disengage the arcuate portions 21 and 22 of the cross-head 19 from the guides 33 in said arms, after which the pressure upon said arms may be released. This same result may also be accomplished by turning the cross-head and causing the curved ends thereof to force the arms 12 and 13 apart and thus free the cross-head therefrom. When the cross-head 19 has been disengage from the arms 12 and 13, the disc-like plunger 15 may be tilted within the jacket 10, and guided edgewise through the two notches 61 in flange 11 and thence into the guideways 33 of the arms 12 and 13. The upper portions of the arms 12 and 13, as clearly shown in Figs. 1 and 2, are spread apart somewhat greater than the distance between the two guideways 33 so that the plunger 15 may be guided out of the embrace of the said arms at such locality. Each of the notches 61 in flange 11 of the jacket 10 is formed within the confines of the joint between one of the arms and the jacket, thus avoiding the weakening of the jacket in the notching of said flange. The cutter 23 may be removed from the plunger structure by simply unscrewing the screw 58 which permits of the withdrawal of spindle 24 from the tube 18. When thus disassembled, all of the parts may be readily scalded and sterilized and any ice cream which might have been accumulated in or upon the parts of the device can be readily removed. In reassembling the device, the operation is exactly the reverse, the cutter 23 being first assembled with the plunger structure, the plunger 15 being next inserted into the jacket 10 and the cross-head 19 finally passed into place with its ends in the guides 33 of arms 12 and 13.

Changes in the specific form of my invention, as herein disclosed, may be made within the scope of what is claimed without departing from the spirit of my invention.

Having described my invention, what I claim as new and desire to protect by Letters Patent is:

1. A jacket-like body open at its opposite ends, a manipulating member projecting from one end of said body and forming a guide, a unitary plunger structure comprising a plunger disc for reciprocation within the body and a head connected with the disc and normally slidably engaged by the manipulating member, said disc being adapted to be removed from and replaced in said body at the end thereof adjacent the manipulating member, said member being adapted to be sprung to free the head therefrom and to reengage the same, whereby the plunger structure, as a unit, may be quickly associated with or disassociated from said body and member.

2. A jacket-like body open at its opposite ends, a manipulating member projecting from one end of said body and comprising arms and a handle joining the same, said arms having facing grooves therein, a unitary plunger structure comprising a plunger disc for reciprocation within the body member and a head connected with the disc and slidably received at its ends in said grooves, said disc being adapted to be removed from and reapplied to said body at the end thereof adjacent the manipulating member and the head being adapted to be freed from and reapplied to said member, whereby the plunger structure, as a unit, may be quickly associated with or disassociated from said body and member.

3. An ice cream packer comprising a cylindrical jacket, a pair of arms secured thereto and extending upwardly therefrom on opposite sides of said jacket, said arms being constructed of sheet metal and formed with a lateral curvature, the curvature at the lower ends conforming to that of said jacket, the curvature above said jacket being more pronounced, a handle formed integrally with the upper portions of said arms, a plunger reciprocable within said jacket, a cross-head movable between the arms and slidably received at its ends by the portions of said arms of greatest curvature, means connecting said cross-head to said plunger, said arms being adapted to be spread apart to permit of the disengagement of said cross-head therefrom.

4. An ice cream packer comprising a jacket formed with a mutilated flange turned inwardly thereof at its upper end, a plunger reciprocable within said jacket and removable from the flanged end thereof, said plunger being of a diameter greater than the lesser diameter of said flange, a pair of guides secured to said jacket, a cross-head slidable along said guides and greater in length than the lesser diameter of said flange, means connecting said cross-head and plunger, said flange serving as a stop for normally limiting the upward movement of said plunger and further serving as a stop for limiting the downward movement of said cross-head.

5. An ice cream packer comprising a jacket, a plunger reciprocable within said jacket, a guide attached to said jacket and projecting therefrom, a stop on said guide, a member slidable along said guide, a tubular connection connecting said member and plunger, a spindle journaled in said tubular connection, a cutter attached to the lower end of said spindle and operating along the lower face of said plunger for severing ice cream adhering thereto, and means attached to the upper end of said spindle for rotating the same to operate said cutter, said means being adapted to engage said stop and limit the movement of the plunger in the jacket.

6. An ice cream packer comprising a jacket open at both ends, a plunger slidable within the jacket, a guide secured to one end of said jacket, a head connected to said plunger and slidable along said guide, a limit stop on the jacket, said plunger normally engaging said stop at the end of its inward thrust, but being disengageable therefrom and removable through the open end of said jacket adjacent said guide.

7. An ice cream packer comprising a jacket open at both ends, a plunger slidable within said jacket, a flange formed at one end of said jacket forming an abutment to limit the inward movement of the plunger a guide secured to said jacket at the flanged end thereof, a head connected with said plunger and slidable along said guide, said head being detachable from said guide and, when detached, permitting of the tilting of said plunger within the jacket, said flange being formed with notches through which said plunger may be passed edgewise in its tilted relation.

8. An ice cream packer comprising a cylindrical jacket having an inwardly turned flange at its upper end, said flange being formed with diametrically opposed notches therein, a plunger reciprocable within said jacket and having a cross-head connected thereto, guiding means extending from the jacket, and serving to guide said cross-head, and to reinforce said jacket adjacent the notched portions of said flange, said cross-head being detachable from said guiding means, the plunger, with the cross-head free from said guiding means, being tiltable within the jacket and removable therefrom edgewise through the notches in said flange.

9. An ice cream packer comprising a cylindrical jacket formed with an inturned flange at the upper end thereof, a plunger disc reciprocable within said jacket, said disc being greater in diameter than the lesser diameter of said flange, arms secured to the jacket for manipulating the same, a cross-head connected with the disc, said arms providing guiding means for the cross-head, said cross-head being adapted to be freed from said arms to permit of the tilting of the disc within the jacket, said flange being notched for the edgewise reception of the disc and said arms serving to reinforce the jacket adjacent the notched portions of said flange.

10. An ice cream packer comprising a jacket, a pair of arms extending from the jacket on opposite sides thereof and secured thereto, said arms being curved laterally for reinforcement and to form facing guideways, a plunger reciprocable within said jacket, a cross-head slidably fitted at its ends within said guideways, and means connecting said plunger and cross-head, the connected cross-head and plunger being adapted readily to be removed from and replaced in the guideways and jacket, respectively.

11. An ice cream packer comprising a jacket, a pair of arms extending from the jacket on opposite sides thereof and secured thereto, said arms being curved laterally for reinforcement and to form facing guideways, a handle secured to said arms, a plunger reciprocable within said jacket and removable therefrom, a cross-head slidably fitted at its ends within said guideways, and means connecting said plunger and cross-head, said cross-head being adapted to play back and forth lengthwise of the guideways between said jacket and handle, said arms being adapted to be sprung apart to free the cross-head from said guideways.

12. An ice cream packer comprising a jacket formed with an inturned flange at the upper end thereof, a plunger reciprocable within said jacket and removable from the flanged end thereof, means associated with the plunger for actuating the same, said flange serving as a stop normally to limit the upward movement of the plunger and the downward movement of said plunger actuating means.

13. An ice cream packer comprising a jacket, a plunger slidable within said jacket, a guide secured to one end of said jacket, a head connected to said plunger and slidable along said guide and removable therefrom, a stop formed on said guide, and a lever pivoted to said head adapted to be swung into a position to engage said stop for limiting the movement of said plunger within the jacket and to be swung into another position to avoid interference with the guide when the head is removed therefrom.

14. An ice cream packer comprising a jacket, a plunger slidable within said jacket, a guide secured to one end of said jacket, a head connected to said plunger and slidable along said guide, a stop on said guide, a cutter associated with said plunger, an operating member for the cutter formed to engage with said stop to limit the movement of said plunger within the jacket.

15. An ice cream packer comprising a jacket, a pair of guides secured to said jacket at one end thereof, a handle attached to said guides, a plunger slidable within said jacket, a cross-head connected to said plunger and slidable along said guides toward and from said handle, and a hold-down member including an extension issuing outwardly and upwardly from said cross-head and further including a hand piece at the extremity of said extension against which the hand may be placed to one side and clear of said guides.

16. In an ice cream packer, a cylindrical jacket having an inturned reinforcing flange at one end thereof formed with a pair of diametrically opposed notches, a member bent into U-shaped form and providing a handle and two parallel arms extending therefrom, said arms being curved laterally to form facing guideways, the ends of the arms being secured to the flanged end of said jacket adjacent the notched portions of said flange and serving to reinforce the jacket at the localities of said notches, a disc-like plunger within the jacket, a cross-head slidable at its ends in said guideways, a connection between the plunger and cross-head, said flange forming a stop for the plunger and for the cross-head, said arms being adapted to be sprung apart to free the cross-head, said plunger, upon the freeing of the cross-head, being adapted to be tilted and passed from the jacket, edgewise through said notches, into the guideways, said arms, adjacent the handle, being offset outwardly to provide a way for the removal of the disc from said guideways.

In testimony whereof I have affixed my signature to this specification.

LOWELL M. LAWRENCE.